Oct. 18, 1927.  1,645,710
J. W. MEADOWCROFT
ELECTRIC WELDING MACHINE
Filed June 20. 1922
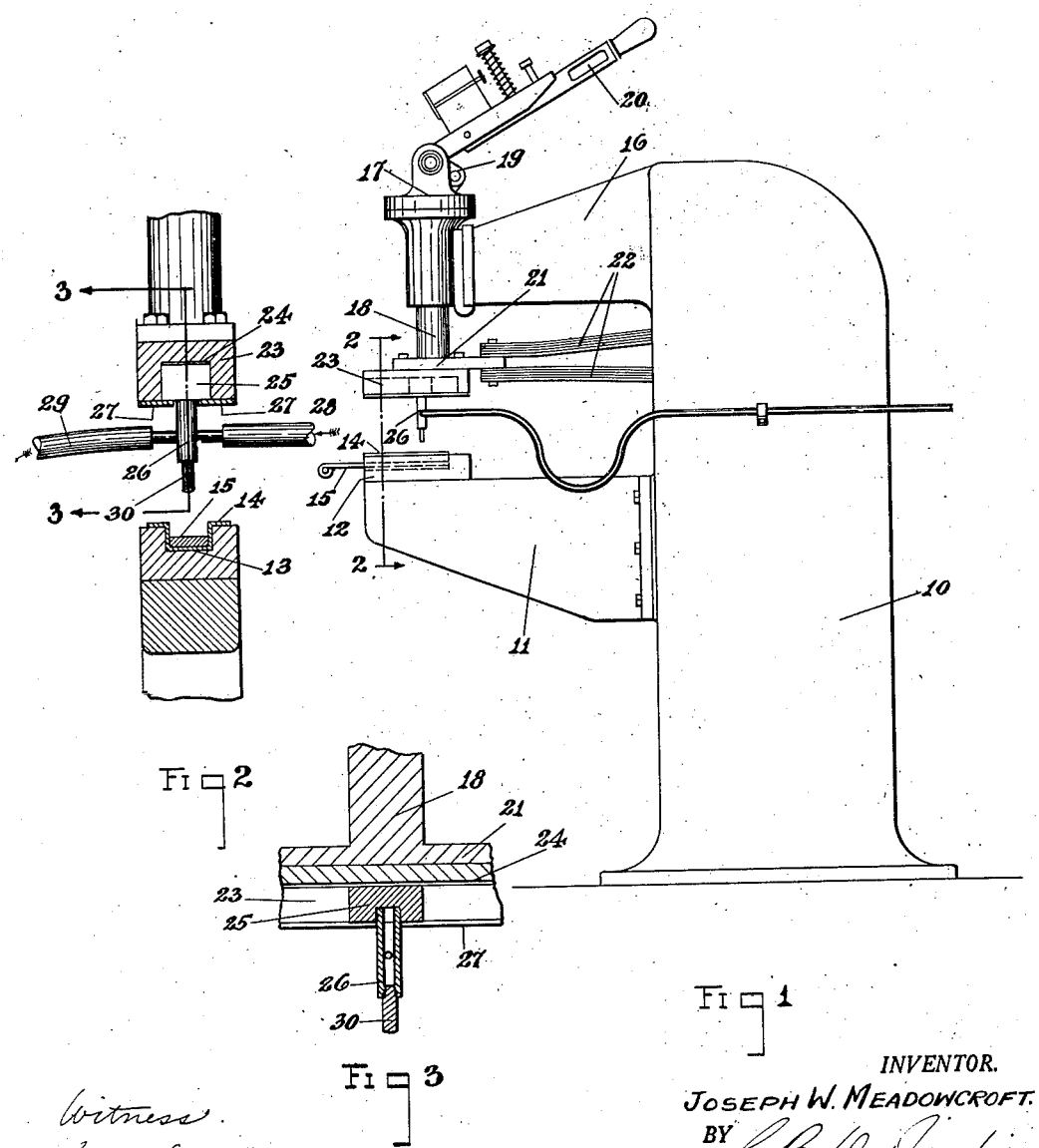
INVENTOR.
JOSEPH W. MEADOWCROFT.
BY
ATTORNEYS.

Patented Oct. 18, 1927.

1,645,710

UNITED STATES PATENT OFFICE.

JOSEPH W. MEADOWCROFT, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

ELECTRIC WELDING MACHINE.

Application filed June 20, 1922. Serial No. 569,577.

My invention relates to improvements in electric welding machines and has to do, more particularly, with that type of electric welding machine known as a spot-welder.

The main object of my invention is to provide a spot-welding machine in which a number of spot welds can be made successively at separated points in the work, without removing the work from the machine or adjusting it therein.

A further object of my invention is to provide a spot-welding machine in which one of the electrodes may be adjusted so as to cooperate with the other electrode in a plurality of different positions, thereby making it possible to form successively a number of separated spot-welds in the work without adjusting the work in the machine.

A further object of my invention is to provide a spot-welding machine including a plunger carrying an electrode, the electrode being adjustable laterally with reference to the plunger, so as to cooperate with the lower or stationary electrode in a plurality of different positions.

A further object of my invention is to provide an electric spot-welding machine which is particularly efficient in operation and in which a number of separated spot welds may be successively formed, in the pieces to be united, very quickly and easily.

Further objects, and objects relating to details and economies of operation and construction, will definitely appear from the detailed description to follow. I accomplish the objects of my invention, in one instance, by the devices and means described in the following specification. My invention is clearly defined and pointed out in the appended claims. A structure constituting a preferred embodiment of my invention is illustrated in the accompanying drawing, forming a part of this specification, in which:

Fig. 1 is a view in side elevation of a spot-welding machine embodying my invention.

Fig. 2 is a detail, enlarged, sectional view, taken on the line 2—2 of Fig. 1, and Fig. 3 is a detail, sectional view, taken on the line 3—3 of Fig. 2.

In the drawing, the same reference numerals refer to the same parts throughout the several views and the sectional views are taken looking in the direction of the arrows at the ends of the section lines.

In spot-welding machines of the usual construction, the weld is effected by a pair of point electrodes consisting of rods of good conducting material arranged in alignment with each other so that, when the work is placed between their ends and the electrodes are brought towards each other, the weld is made at the points at which the ends of said electrodes contact with the work. One of these electrodes is usually fixed and the other movable, and the movable electrode is carried by and mounted in fixed relation to a reciprocable plunger. In case it is desired to effect welds at various separated points in the work, it is necessary to remove the work from between the electrodes and replace it in a different position, or otherwise to displace and adjust the work between the electrodes for each weld. This is objectionable because it consumes time and labor to effect the proper displacement, rearrangement and adjustment of the work for each successive spot-weld, thereby increasing the cost of the welding operation. It is among the special objects and purposes of my present invention to avoid these and other objections and to provide a spot-welding machine in which successive spot-welds may be made at separated points in the work without shifting, adjusting or otherwise disturbing the work in the machine. In carrying out my invention, in one practical embodiment thereof, I propose to so mount one of the electrodes that it is movable or shiftable laterally relative to the line of movement of the reciprocable plunger, so that it may be brought to the various positions to effect such welds at separated points in the work without disturbing or moving the latter. I also propose to employ an electrode cooperating with such laterally shiftable electrode and having extended length or area laterally with respect to the line of movement of the plunger, so as to present a laterally extending surface to be engaged by the work and to cooperate with the laterally-shiftable electrode in whatever position the latter may be placed in effecting the successive and separated welds. More specifically, I purpose to employ a stationary electrode having an extended contact area and a movable point electrode which may be adjusted or shifted laterally with respect to the line of movement of said point electrode toward the stationary electrode.

Referring to the numbered parts of the drawing, in which I have illustrated a specific embodiment of my invention, I have shown a welding machine comprising a frame, 10, having a lower, laterally-extending arm, 11, and an upper, laterally-extending arm, 16. The lower arm, 11, carries the conductor plate or bar, 12, which is connected to one side of a source of welding current, for instance, the secondary of a suitable transformer. This conductor bar or plate, 12, constituting the lower or stationary electrode of the machine, acts as an anvil upon which the pieces to be united are placed. In the particular embodiment illustrated, the conductor bar, 12, is provided with a groove, 13, to receive and center the work. This particular machine is designed for fastening the strap or bar, 15, to the channel member, 14, and the said channel member, 14, is placed in the groove, 13, with the strap or bar, 15, in position therein, as shown in Figs. 1 and 2 of the drawing.

The upper arm, 16, of the welding machine frame, carries the head, 17, which is swivelled thereon so that the operating lever may extend out at various angles, and the head, 17, carries the plunger, 18, which is vertically reciprocable. The plunger, 18, may be reciprocated by means of a toggle linkage, 19, actuated by the operating lever, 20, carried by the head, 17. A strap or bar, 21, of conducting material, is secured to the lower end of the plunger, 18, and connected by the leads, 22, to the opposite side of the transformer secondary from that to which the conductor bar, 12, is connected. An electrode holder welding head, 23, is rigidly fastened to the bar, 21, and provided with a longitudinally-extending groove or channel, 24, constituting a guide-way in which the current conveying head or slide, 25, at the upper end of the movable electrode, 26, is mounted. Plates, 27, secured to the lower surface of the holder, 23, overhang the open side of the groove or channel, 24, and retain the head, 25, of the movable electrode in place therein, while permitting it to slide in the guide-way. The electrode, 26, may be provided with the usual removable point or tip, 30, and may be cooled in the usual manner, the cooling water entering through the tube, 28, and leaving through the tube, 29.

The operation of this machine will be apparent from the foregoing description. The pieces to be united, for instance, the channel member, 14, and strap, 15, are placed in superposed relation upon the conducting bar or plate, 12, forming the lower or stationary electrode. When the operating lever, 20, is pulled down, the plunger, 18, is reciprocated, bringing the electrode point, 30, in contact with the pieces to be united under pressure, and forming a spot-weld at the spot where this electrode point contacts with the work. When the operating lever is released, the upper electrode raises and the operator may shift it laterally so that it will cooperate with the lower or stationary electrode, 12, at another point, to form another spot-weld which is spaced from that first made. In this way, the operator, by shifting the movable electrode, 26, laterally, with respect to the axis of the plunger, 18, may make a series of separated spot-welds in the pieces to be united, without moving or adjusting these pieces in the machine. The head, 25, of the electrode, 26, slides in the guide-way formed in the holder, 23, and the operator may shift the electrode manually from one position to the other. The bar, 21, which carries the electrode holder, 23, is connected to the welding transformer and the welding current passes through bar, 21, holder, 23, to the head of the electrode, 26, and thence through the electrode to the work.

I am aware that the particular spot-welding machine which is illustrated in the accompanying drawing, is susceptible of considerable variation, without departing from the spirit of my invention and, therefore, I desire to claim my invention broadly, as indicated by the appended claims.

Having thus described my invention, what I claim as new and useful and desire to secure by Letters Patent is:

1. An electric welding machine comprising a relatively stationary electrode connected to one side of a source of welding current, a reciprocable plunger, a holder carried by said plunger and having a transverse guide-way underlying said plunger, an electrode slidably mounted in said guide-way and connected to the opposite side of said source of current, and means for reciprocating said plunger.

2. An electric welding machine comprising a relatively stationary electrode connected to one side of a source of welding current, a reciprocable plunger, a holder carried by said plunger and connected to the opposite side of said source of current, said holder having a transverse guide-way underlying said plunger, a second electrode having a conducting terminal head slidably mounted in said guide-way, and means for reciprocating said plunger.

3. A welding machine comprising a reciprocable plunger, a welding head on the end thereof having a transverse channel underlying the plunger, a pair of plates secured to the lower surface of said welding head and overhanging opposite sides of said channel whereby to form a guide-way, a welding electrode adjustably mounted in said guide-way in extension of the plunger, and means to supply welding current to the welding head.

4. An electric welding machine comprising a vertically reciprocable welding head having a longitudinally extending channel in the lower surface thereof, a pair of longitudinally extending plates secured to said welding head at opposite sides of and overhanging said channel, and a welding electrode slidably positioned in said channel by the overhanging portions of said plates.

In testimony whereof, I affix my signature.

JOSEPH W. MEADOWCROFT.